United States Patent
Kim et al.

(10) Patent No.: US 9,821,685 B2
(45) Date of Patent: Nov. 21, 2017

(54) PUMPING DEVICE FOR VEHICLE SEAT

(71) Applicant: DAS Co., Ltd., Gyeongsangbuk-do (KR)

(72) Inventors: Jae-Ho Kim, Gyeongsangbuk-do (KR); Jin-Ho Choi, Gyeongsangbuk-do (KR)

(73) Assignee: DAS CO., LTD. (KR)

( * ) Notice: Subject to any disclaimer, the term of this patent is extended or adjusted under 35 U.S.C. 154(b) by 235 days.

(21) Appl. No.: 14/647,987

(22) PCT Filed: Nov. 29, 2013

(86) PCT No.: PCT/KR2013/010978
§ 371 (c)(1),
(2) Date: May 28, 2015

(87) PCT Pub. No.: WO2014/084652
PCT Pub. Date: Jun. 5, 2014

(65) Prior Publication Data
US 2015/0314709 A1 Nov. 5, 2015

(30) Foreign Application Priority Data
Nov. 29, 2012 (KR) ........................ 10-2012-0137055

(51) Int. Cl.
*B60N 2/16* (2006.01)
*B60N 2/18* (2006.01)
*B60N 2/44* (2006.01)

(52) U.S. Cl.
CPC ........... *B60N 2/1635* (2013.01); *B60N 2/165* (2013.01); *B60N 2/168* (2013.01); *B60N 2/169* (2013.01);
(Continued)

(58) Field of Classification Search
CPC ...... B60N 2/1635; B60N 2/165; B60N 2/168; B60N 2/169; B60N 2/1864; B60N 2/1884; B60N 2/444; B60N 2/16
See application file for complete search history.

(56) References Cited

U.S. PATENT DOCUMENTS

| 8,678,154 B2 | 3/2014 | Kim | |
|---|---|---|---|
| 2003/0061899 A1* | 4/2003 | Liu | B60N 2/2354 74/575 |
| 2006/0278774 A1* | 12/2006 | Garnier | B60N 2/2257 248/157 |

FOREIGN PATENT DOCUMENTS

| DE | 10 2011 005574 A | 11/2011 |
|---|---|---|
| JP | 2010127418 A | 6/2010 |

(Continued)

OTHER PUBLICATIONS

International Search Report for PCT/KR2013/010978, dated Mar. 20, 2014, pp. 1-3.
(Continued)

*Primary Examiner* — Huan Le
(74) *Attorney, Agent, or Firm* — Tarolli, Sundheim, Covell & Tummino LLP

(57) ABSTRACT

A pumping device is disclosed for a vehicle seat, including a clutch means for receiving rotational force from the outside and transferring power to a link means of a seat cushion. The clutch means includes a clutch block rotated by the rotational force transferred from the outside, a clutch drum which is provided with the clutch block in an inside space and transfers the power to the link means of the seat cushion while rotating by the rotational force transferred from the clutch block, and a plurality of fitting pieces interposed between an outer peripheral surface of the clutch block and an inner peripheral surface of the clutch drum and transferring the rotational force of the clutch block to the
(Continued)

clutch drum. The clutch block has a protrusion portion protruding radially from the outer peripheral surface and thus stress concentration is not generated on the plurality of fitting pieces.

5 Claims, 5 Drawing Sheets

(52) U.S. Cl.
CPC ......... *B60N 2/1864* (2013.01); *B60N 2/1889* (2013.01); *B60N 2/444* (2013.01)

(56) References Cited

FOREIGN PATENT DOCUMENTS

| | | | |
|---|---|---|---|
| JP | 2011153675 | A | 8/2011 |
| KR | 20070096771 | A | 10/2007 |
| KR | 20080028088 | A | 3/2008 |
| KR | 20110122045 | A | 11/2011 |
| WO | 2007/111414 | A1 | 10/2007 |

OTHER PUBLICATIONS

Office Action for German Application No. 11 2013 005 701.8 dated Aug. 3, 2017.

\* cited by examiner

PUMPING DEVICE FOR VEHICLE SEAT

RELATED APPLICATIONS

The present invention is a U.S. National Stage under 35 USC 371 patent application, claiming priority to Serial No. PCT/KR2013/010978, filed on 29 Nov. 2013; which claims priority from Korean Application No. 10-2012-0137055, filed 29 Nov. 2012, the entirety of both of which are incorporated herein by reference.

TECHNICAL FIELD

The present invention relates to a pumping device for a vehicle seat, capable of adjusting a height of a seat and maintaining the adjusted height in such a manner that a user operates a link means of a seat cushion with operating force.

BACKGROUND ART

In general, a driver seat, an occupant seat, and seats as other occupant seats, which are installed in front of and behind the interior of a vehicle, have various comfort devices for convenience of occupants.

The comfort devices have a sliding function of adjusting forward and rearward pushing/pulling of the seat, a reclining function of adjusting an inclination of a backrest, etc., according to body types of the occupants.

In addition, a vehicle, which is recently developed or has a predetermined reference or more, also includes a pumping device having a seat cushion lifting function of adjusting a height of a seat cushion 10 by receiving input from a handle lever 20 so as to be suitable for occupants, as illustrated in FIG. 1.

The pumping device is largely configured of a lever unit, a clutch unit, and a brake unit. The lever unit receives operating force of a user and transfers the operating force to the clutch unit. The clutch unit serves to transfer the input operating force (rotational force) of the user to a link means of the seat cushion 10. The brake unit serves to cut off power input in reverse so as to fix the link means an operation of which is completed.

The lever unit includes a lever bracket which converts vertical operating force of the handle lever 20 installed at one side of the seat cushion 10 into rotational force and transfers the rotational force to the clutch unit.

An output shaft, which finally transfers the operating force transferred from the clutch unit to the link means of the seat cushion 10, is fixed by the brake unit after the operation of the user is completed, thereby restricting the output shaft from rotating by power input in reverse.

As a specific example of the pumping device, there is a pumping device disclosed in Korean Patent No. 10-1117794.

The pumping device disclosed in the above patent includes a plurality of fitting pieces 8 which transfer rotational force of a clutch block to a clutch drum while rotating along with the clutch block, as illustrated in FIG. 2.

The plurality of fitting pieces 8 are provided with a plurality of adjacent rollers and has an arc shape as a whole. Accordingly, the plurality of fitting pieces 8 form a non-contact space S corresponding to a space between the rollers 8a and 8b located at both end portions of the plurality of fitting pieces 9 so as not to come into contact with the clutch block 4 in the non-contact space S. When rotational force acts on the clutch block 4, support force does act on a portion of an outer peripheral surface of the clutch block 4 facing the non-contact space S.

In the conventional pumping device for a vehicle seat having the above structure, a deviation is generated between loads acting on the respective rollers of the torque transfer portion 8, thereby causing deformation or damage on components.

Specifically, when the clutch block 4 rotates, for example, in the clockwise direction, reaction force acts on the clutch block 4 due to friction force between the clutch block 4 and the rollers.

In this case, the clutch block 4 tends to move toward the non-contact space S by a force F acting toward the non-contact space S from among force components of the reaction force.

By such a force F, stress concentration is generated on the roller 8b located at the right end portion of the torque transfer portion 8 from among the rollers thereof or on the rollers adjacent to the right end portion including the roller 8b. Such stress concentration causes the clutch drum 7, on which friction force acts by the roller, and other components, which are subject to force transferred from the clutch drum 7, to be deformed or damaged.

DISCLOSURE

Technical Problem

Accordingly, the present invention has been made in view of the above-mentioned problems, and an object thereof is to provide a pumping device for a vehicle seat, capable of preventing components such as a clutch drum from being deformed or damaged by preventing stress from being concentrated on rollers of a plurality of fitting pieces.

Technical Solution

In accordance with an aspect of the present invention, a pumping device for a vehicle seat, includes a clutch means for receiving rotational force from the outside and transferring power to a link means of a seat cushion. The clutch means includes a clutch block rotated by the rotational force transferred from the outside, a clutch drum transferring the power to the link means of the seat cushion while rotating by the rotational force transferred from the clutch block, and a plurality of fitting pieces interposed between an outer peripheral surface of the clutch block and an inner peripheral surface of the clutch drum and transferring the rotational force of the clutch block to the clutch drum. The clutch block has a protrusion portion extending between both spaced end portions of the plurality of fitting pieces while protruding radially from the outer peripheral surface of the clutch block.

In the pumping device according to the aspect of the present invention, an outside surface of the protrusion portion may come into contact with a circumferential surface of the clutch drum.

In the pumping device according to the aspect of the present invention, a clearance which does not exceed 0.5 mm may be present between an outside surface of the protrusion portion and the inner peripheral surface of the clutch drum.

In the pumping device according to the aspect of the present invention, an outside surface of the protrusion portion may be a curved surface.

In the pumping device according to the aspect of the present invention, the outside surface of the protrusion portion may have the same radius of curvature as that of the inner peripheral surface of the clutch drum.

Additional advantages, objects, and features of the invention will be set forth in part in the description which follows and in part will become apparent to those having ordinary skill in the art upon examination of the following or may be learned from practice of the invention.

BRIEF DESCRIPTION OF DRAWINGS

The above and other objects, features and other advantages of the present invention will be more clearly understood from the following detailed description taken in conjunction with the accompanying drawings, in which.

BEST MODE FOR INVENTION

Hereinafter, a pumping device for a vehicle seat according to exemplary embodiments of the present invention will be described in detail with reference to the accompanying drawings.

Figure 3:
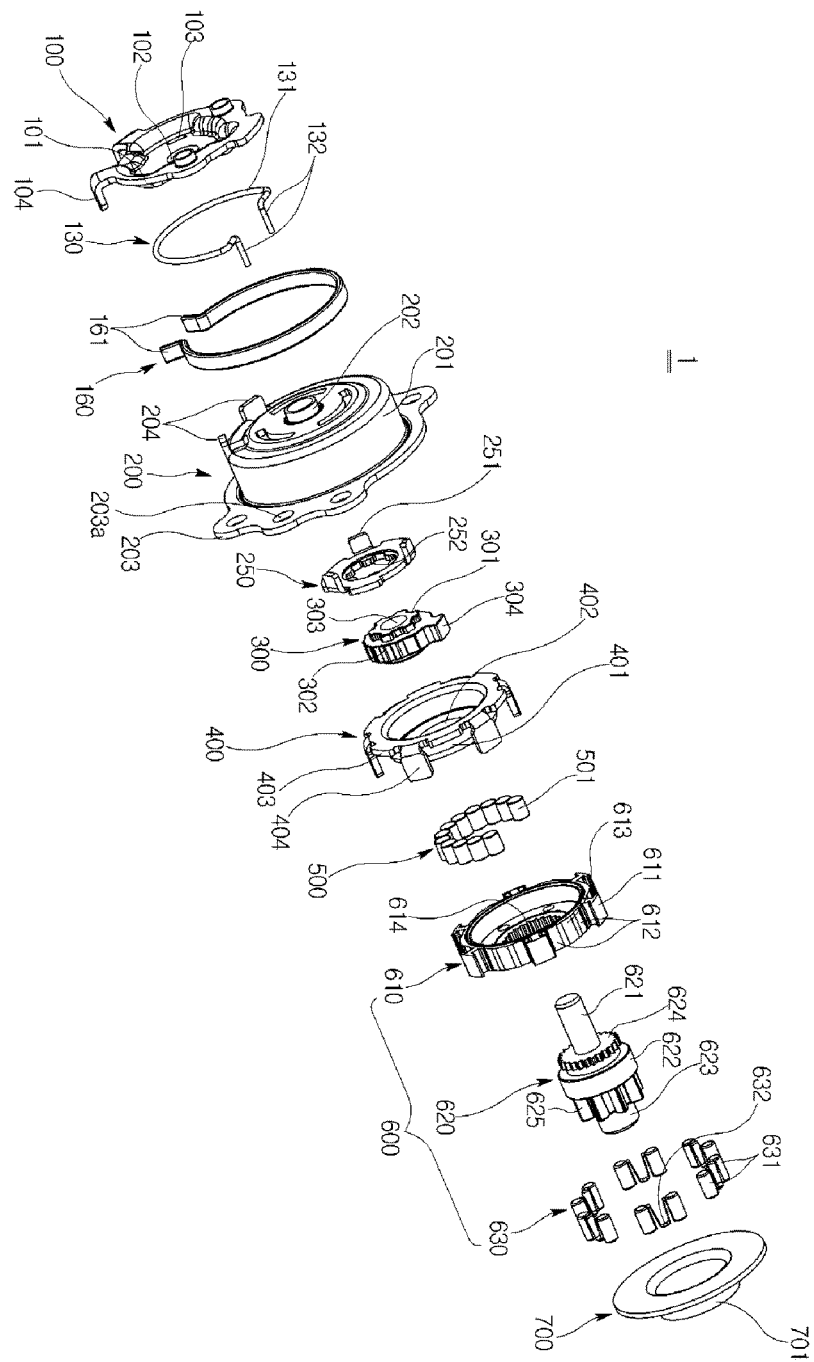
FIG. 3 is an exploded perspective view illustrating a pumping device according to an embodiment of the present invention.
Figure 4:
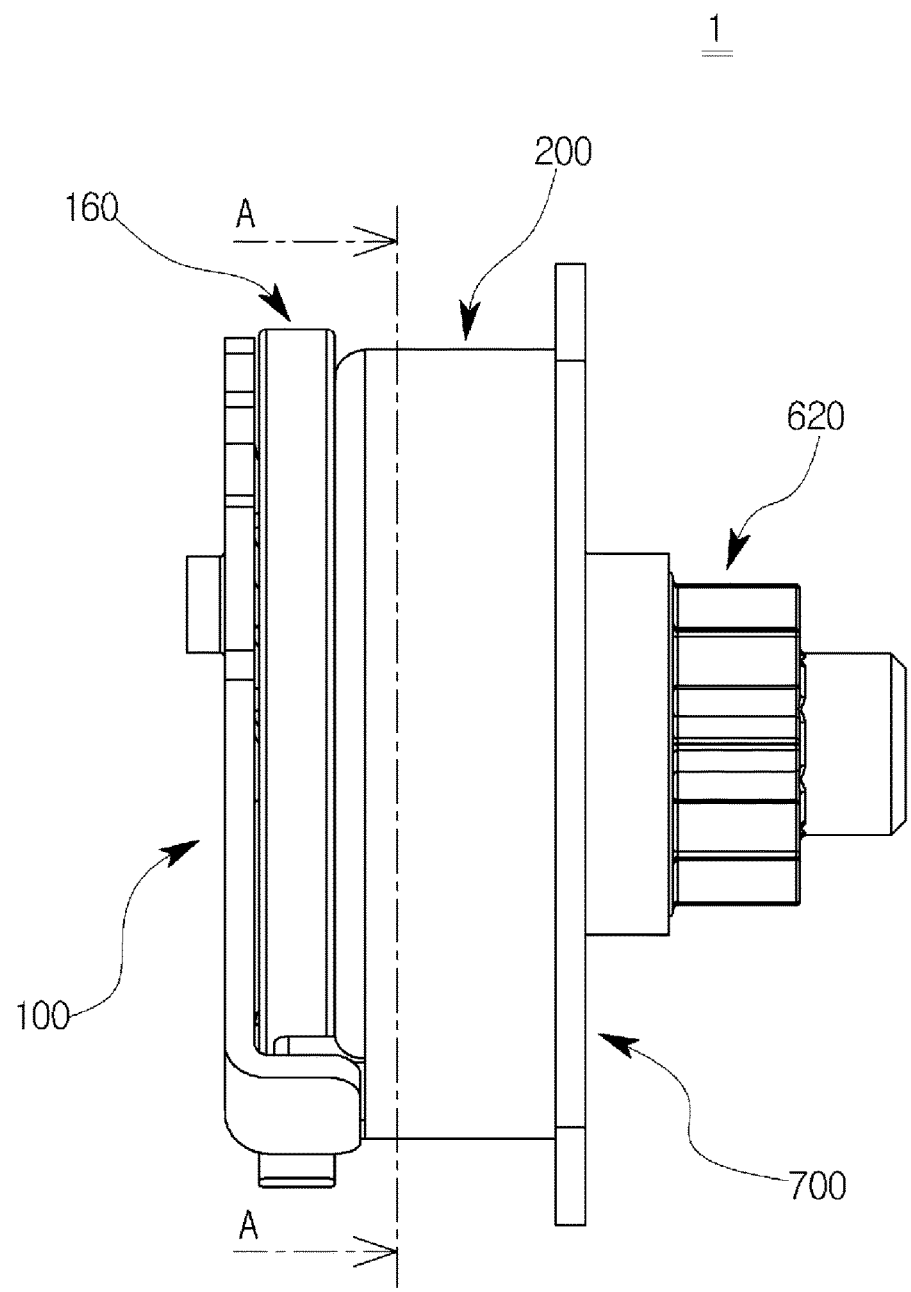
FIG. 4 is a side view illustrating the pumping device according to the embodiment of the present invention.
Figure 5:
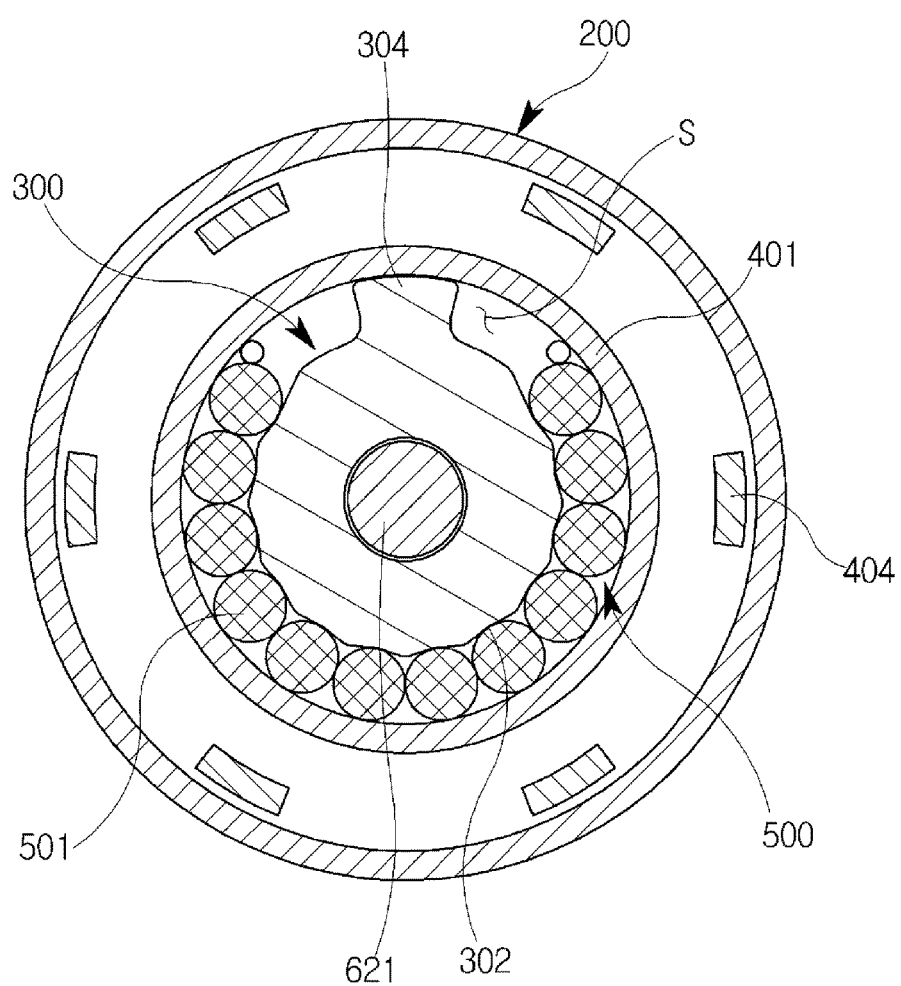
FIG. 5 is a cross-sectional view taken along line "A-A" in FIG. 4.

FIG. 3 is an exploded perspective view illustrating a pumping device according to an embodiment of the present invention. FIG. 4 is a side view illustrating the pumping device according to the embodiment of the present invention. FIG. 5 is a cross-sectional view taken along line "A-A" in FIG. 4.

Figure 1:
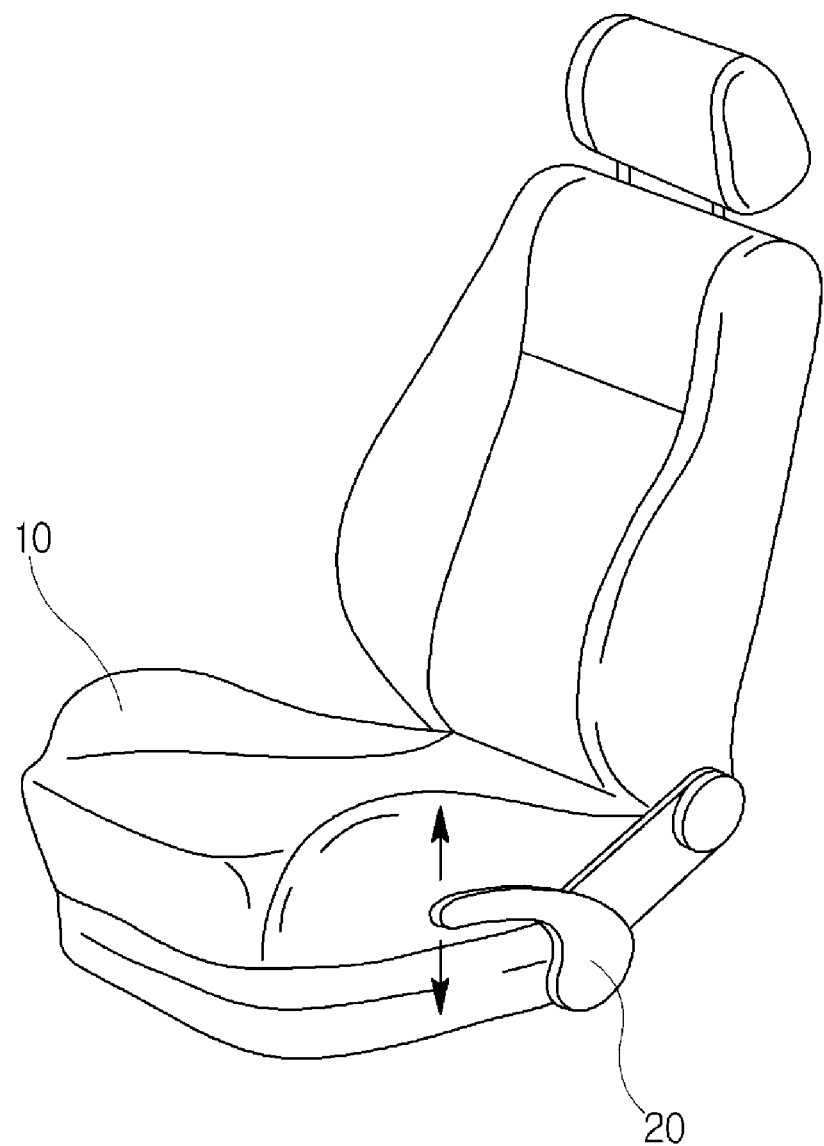
FIG. 1 is a view illustrating a vehicle seat.
Figure 2:
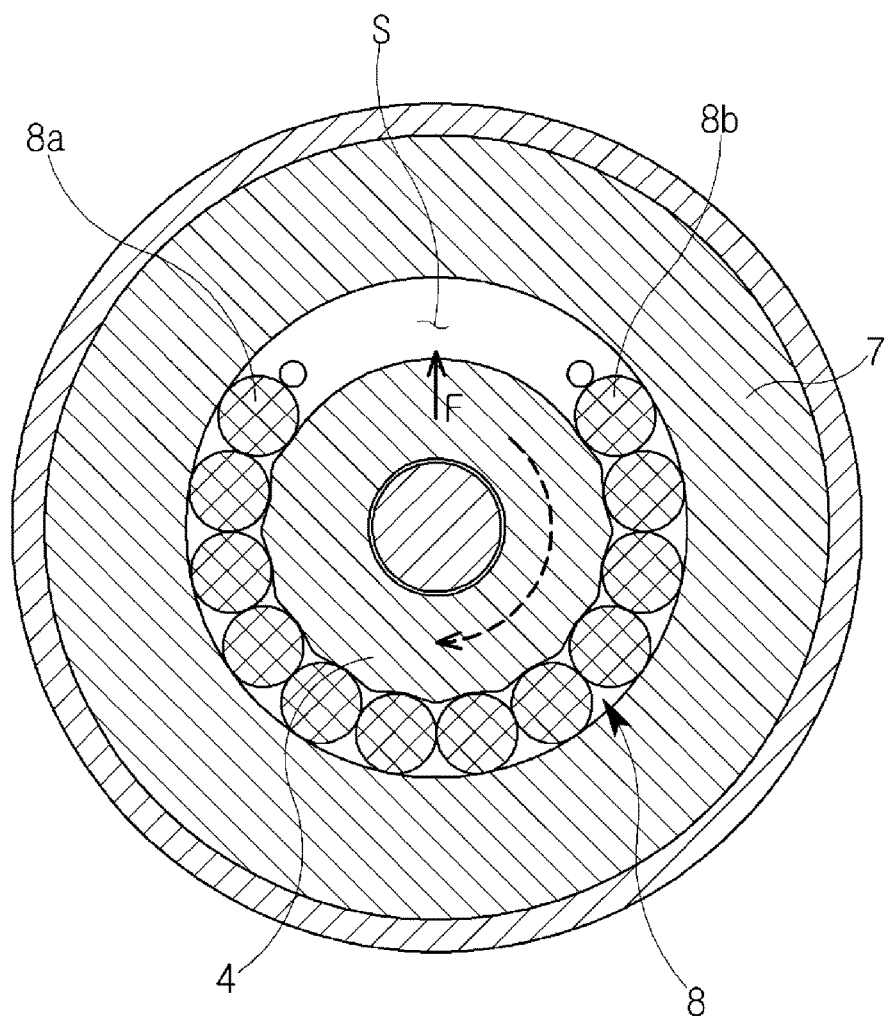
FIG. 2 is a cross-sectional view illustrating a conventional pumping device.

As illustrated in FIGS. 3 to 5, the pumping device for a vehicle seat according to the embodiment of the present invention, which is designated by reference numeral 1, includes a clutch means for receiving rotational force from the outside and transferring power to a link means of a seat cushion 10 (see FIG. 1). The clutch means includes a clutch block 300 rotated by rotational force transferred from the outside, a clutch drum 400 which is provided with the clutch block 300 in an inside space thereof and transfers the power to the link means of the seat cushion 10 while rotating by the rotational force transferred from the clutch block 300, and a plurality of fitting pieces 500 which are interposed between an outer peripheral surface of the clutch block 300 and an inner peripheral surface of the clutch drum 400 and transfers the rotational force of the clutch block 300 to the clutch drum 400. The clutch block 300 may have a protrusion portion 304 which protrudes between both spaced end portions of the plurality of fitting pieces 500 while protruding radially from the outer peripheral surface of the clutch block 300.

The clutch means may be accommodated in a housing 200, and a specific example of the housing 200 will be described below.

The housing 200 is fixed to the seat cushion 10. The housing 200 may have a space formed therein, and have a shape in which the front thereof is closed and the rear thereof is opened. In more detail, the housing 200 may include a cylindrical body portion 201 and a flange portion 203 which extends radially from an outer peripheral surface at the opened rear of the body portion 201, as illustrated in the drawings.

The body portion 201 may have a shaft coupling portion 202 formed at a center of a front surface thereof such that a tip portion of an output shaft 620 to be described later is rotatably coupled through the shaft coupling portion 202. The shaft coupling portion 202 may have a hole formed therein such that the tip portion of the output shaft 620 is coupled through the hole, and have a cylindrical shape protruding forward from the front surface of the body portion 201. The shaft coupling portion 202 may pass through a coupling hole 102 of a lever bracket 100 to be described later and allow the lever bracket 100 to be arranged and supported on the same axis as that of the output shaft 620. The shaft coupling portion 202, for example, the front surface of the body portion 201 may be formed through a burring process.

The body portion 201 may have a plurality of guide slots 201a formed on the front surface thereof, and the guide slots 201a may be circumferentially spaced apart from each other about the shaft coupling portion 202. An example in which three guide slots 201 are formed is illustrated in the drawings.

First, the plurality of fitting pieces 500 to be described later may be provided with elastic force so as to be returned and rotated. An elastic means may be used to provide the elastic force to the plurality of fitting pieces 500.

As a specific example of the elastic means, there is proposed a clutch spring 130 including a ring-shaped main body portion 131 and a pair of bending portions 132 bent from both end portions of the main body portion 131, as illustrated in the drawings.

The bending portions 132 of the clutch spring 130 may pass through any one (hereinafter, referred to as "first guide slot") of the three guide slots 201a. Respective end portions of the bending portions 132 come into contact with both end portions of the plurality of fitting pieces 500 so as to transfer the elastic force to the plurality of fitting pieces 500.

Specifically, one of the bending portions 132 is pushed and moved by one end portion of the plurality of fitting pieces 500 according to rotation of the plurality of fitting pieces 500. In this case, the moving bending portion 132 is guided in a longitudinal direction of the first guide slot.

Since the other of the bending portions 132 is supported by an end of the first guide slot so as not to move, the clutch spring 130 generates restoring force when the bending portions 132 are close to each other. The restoring force serves as external force for returning and rotating the plurality of fitting pieces 500.

Three connection legs 251 formed at a connection member 250 to be described later may pass through the three guide slots 201a including the first guide slot. In this case, the bending portions 132 are located at both sides of the associated connection leg 251 passing through the first guide slot. The connection legs 251 passing through the respective guide slots 201a may be guided to move in the longitudinal directions of the guide slots 201a. Since the connection legs 251 move only by fixed lengths of the respective guide slots 201a, it is possible to limit an angle of rotation of the connection member 250.

The flange portion 203 may have a plurality of fastening holes 203a so as to be fixed to the seat cushion 10.

The housing 200 may be made of any material. However, a relatively large load may act on the housing 200 since an inner peripheral surface of the housing 200 serves as a wedge friction surface with respect to a roller assembly 630 which may be included in a brake means 600 to be described later. With this point in view, the housing 200 may be manufactured, for example, by press processing a plate made of metal material and be heat treated to have certain stiffness.

The clutch means receives rotational force from the outside. For example, the clutch means may receive rotational force from the lever bracket 100 connected to a handle lever 20 (see FIG. 1). Specifically, the lever bracket 100 may be connected to the handle lever 20 rotated by operation of a seat occupant. The lever bracket 100 may rotate along with rotation of the handle lever 20, and the clutch block 300 included in the clutch means may receive rotational force from the lever bracket 100.

A specific example of the lever bracket 100 will be described below.

The lever bracket 100 may be rotatably coupled to the front surface of the housing 200. The lever bracket 100 may include, for example, a bracket body 101 and a bracket leg 104 as illustrated in the drawings.

In the drawings, the bracket body 101 may be arranged so as to be overlapped with the front surface of the body portion 201. The bracket body 101 may have the coupling hole 102 formed at a center thereof such that the shaft coupling portion 202 passes through the coupling hole 102. The shaft coupling portion 202 is coupled to the coupling hole 102, thereby enabling the lever bracket 100 to be rotatably supported by the shaft coupling portion 202.

Three leg slots 103 may be formed on the bracket body 101 while being circumferentially spaced apart from each other about the coupling hole 102. The connection legs 251 may be coupled through the leg slots 103, and thus the connection member 250 and the lever bracket 100 may integrally rotate. In this case, since the angle of rotation of the connection member 250 is limited as described above, an angle of rotation of the lever bracket 100 may also be limited.

The bracket leg 104 may be configured of a pair of bracket legs bent from an outer peripheral surface of the bracket body 101.

First, it is necessary to return and rotate the lever bracket 100 such that the handle lever 20 is returned and rotated when the operation of the handle lever 20 by the occupant is completed. An elastic means for providing elastic force to the lever bracket 100 may be used to return and rotate the lever bracket 100. The elastic means, for example, may be an annular return spring 160 illustrated in the drawings.

The return spring 160 may be coupled to the front of the body portion 201. Inside surfaces of the pair of bracket legs 104 may respectively come into contact with outside surfaces of a pair of bent portions 161 formed at both end portions of the return spring 160 so as to be supported thereby.

The pair of bent portions 161 may be supported by a pair of stopper portions 204 protruding forward from the front surface of the body portion 201 such that a gap between the bent portions 161 is not increased any more.

When the lever bracket 100 rotates in a state in which the bracket legs 104 come into contact with the bent portions 161, any one of the bent portions 161 moves to the other thereof while being pressed by the associated bracket leg 104. In this case, the return spring 160 may generate restoring force, and the restoring force may serve as external force for returning and rotating the lever bracket 100.

In the embodiment, the clutch means may include a clutch block 300, a clutch drum 400, and a plurality of fitting pieces 500.

The clutch block 300 may be accommodated in the housing 200, and be rotated by rotational force transferred from the outside, for example, the lever bracket 100. The rotational force of the clutch block 300 may be transferred to the clutch drum 400 to be described later.

When the clutch block 300 receives the rotational force from the lever bracket 100, the clutch block 300 is connected to the lever bracket 100. The clutch block 300 may be directly connected to the lever bracket 100, or may also be connected to the lever bracket 100 through the connection member 250 as illustrated in the drawings.

In the drawings, the clutch block 300 may have a spline portion 301 protruding forward from the front surface thereof so as to be coupled to the connection member 250. The spline portion 301 may have a spline formed on an outer peripheral surface thereof.

The connection member 250 may be arranged in front of the clutch block 300, and have a spline-shaped spline hole 252 formed at a center thereof such that the spline portion 301 is coupled to the spline hole 252. The clutch block 300 may integrally rotate with the connection member 250 by coupling the spline portion 301 to the spline hole 252 of the connection member 250.

The connection member 250 may have the three connection legs 251 which are bent from the outer peripheral surface thereof and extend forward. The connection legs 251 may pass through the guide slots 201*a* to be coupled though the leg slots 103 of the lever bracket 100. The connection member 250 is coupled to the lever bracket 100, thereby enabling rotational force to be transferred from the lever bracket 100 to the clutch block 300.

The spline portion 301 of the clutch block 300 may have an insertion hole 303 formed at a center thereof such that the tip portion of the output shaft 620 passes through the insertion hole 303. The clutch block 300 may have a plurality of cam surfaces 302 formed on the outer peripheral surface thereof, and the cam surfaces 302 are continuously formed at regular intervals in the circumferential direction. Each of the cam surfaces 302 may be a concave curved surface or have a planar shape.

The clutch drum 400 may be accommodated in the housing 200, and be rotated by the rotational force transferred from the clutch block 300. The rotation force of the clutch drum 400 is transferred to the output shaft 620 and the output shaft 620 transfers power to the link means of the seat cushion 10, thereby enabling a height of the seat cushion 10 to be adjusted.

The clutch drum 400 may include, for example, a drum portion 401 having a drum shape as illustrated in the drawings. The drum portion 401 may have a through-hole 402 formed at a center thereof such that the tip portion of the output shaft 620 passes through the through-hole 402.

The clutch drum 400 may be accommodated in the housing 200. In this case, the clutch block 300 is inserted toward the opened front of the drum portion 401, and may be arranged in the inside space of the clutch drum 400.

In this case, a gap is circumferentially generated between the inner peripheral surface of the drum portion 401 and the outer peripheral surface of the clutch block 300, and the plurality of fitting pieces 500 may be disposed at the gap.

The drum portion 401 may have a flange portion 403 which extends radially from the front outer periphery thereof. The flange portion 403 may have clutch legs 404 bent rearward from the outer periphery thereof.

The plurality of fitting pieces 500 serves to transfer the rotational force of the clutch block 300 to the clutch drum 400. The plurality of fitting pieces 500, for example, may be provided with a plurality of adjacent rollers 501. The plurality of fitting pieces 500 may have an arc shape as a whole, and the rollers 501 located at both end portions of the plurality of fitting pieces 500 may be spaced apart from each other.

The respective rollers 501 may be arranged on the cam surfaces 302 formed on the outer peripheral surface of the clutch block 300 in one-to-one correspondence manner. In a state in which the plurality of fitting pieces 500 is interposed between the outer peripheral surface of the clutch block 300 and the inner peripheral surface of the clutch drum 400, the plurality of fitting pieces 500 may generate friction force between the clutch block 300 and the rollers 501 and between the rollers 501 and the clutch drum 400. In more detail, the plurality of fitting pieces 500 may generate friction force between the cam surfaces 302 and the rollers 501 and between the rollers 501 and the inner peripheral surface of the drum portion 401. Through such friction force, the rotational force of the clutch block 300 may be transferred to the clutch drum 400.

Meanwhile, the pumping device according to the embodiment may further include a brake means for selectively restricting the link means of the seat cushion 10 such that the link means is not moved when the link means completes the height adjustment of the seat cushion 10 by the rotational force transferred from the clutch drum 400.

As the brake means for performing the above function, various brake means may be applied, such as the brake means having a specific example described below and the known brake means included in the pumping device.

As a specific example of the brake means, there is proposed a brake means 600 including a brake wedge 610, an output shaft 620, and a roller assembly 630.

The brake wedge 610 has a drum shape in which the front thereof is opened. The drum portion 401 of the clutch drum 400 may be accommodated in the brake wedge 610. In this case, an outside portion of the brake wedge 610 may be inserted into a space between the outer peripheral surface of the drum portion 401 and inside surfaces of the clutch legs 404.

The brake wedge 610 may have wedge bosses 611 protruding radially from an outer peripheral surface thereof. When the clutch drum 400 engages with the brake wedge 610, the clutch legs 404 may be located between the wedge bosses 611.

The output shaft 620 may serve to finally transfer rotational force transferred from the clutch drum 400 to the link means of the seat cushion 10.

The output shaft 620 may include a first shaft 621 which is rotatably coupled to the shaft coupling portion 202 of the housing 200 while sequentially passing through the brake wedge 610, the clutch drum 400, and the clutch block 300. In addition, the output shaft 620 may include a second shaft 622 which is formed continuously behind the first shaft 621 and is rotatably coupled through a shaft coupling portion 701 of a cover plate 700 to be described later. In addition, the output shaft 620 may include a third shaft 623 which is formed continuously behind the second shaft 622 and extends rearward from the cover plate 700.

In this case, the first shaft 621 may have a first spline shaft 624 formed at one side thereof. The brake wedge 610 may have a spline hole 614 which is formed at a center thereof and corresponds to the first spline shaft 624. The output shaft 620 may rotate along with the brake wedge 610 by coupling the first spline shaft 624 to the spline hole 614.

The third shaft 623 may have a second spline shaft 625 which is formed at one side thereof to transfer power to the link means of the seat cushion 10.

The roller assembly 630 may be interposed between the outer peripheral surface of the brake wedge 610 and the inner peripheral surface of the housing 200, and may generate friction force so as to restrict rotation of the brake wedge 610.

Specifically, the roller assembly 630 may be configured of a plurality of roller assemblies, each including a pair of rollers 631 and a roller spring 632 for providing elastic force such that the rollers 631 are away from each other when being closed to each other while connecting the rollers 631.

The roller spring 632 may be arranged to surround the associated wedge boss 611. The pair of rollers 631 may come into contact with the outer peripheral surface of the brake wedge 610 while being located such that the wedge boss 611 is interposed therebetween.

Meanwhile, the brake wedge 610 may be formed with roller location surfaces 612 formed on the outer peripheral surface thereof for insertion of the associated rollers 631 being interposed between the associated wedge bosses 611. Restraint section surfaces 613, which protrude radially from the outer peripheral surface of the brake wedge 610, may be formed between the associated roller location surfaces 612. The clutch legs 404 may be located so as to face the respective restraint section surfaces 613 between the wedge bosses 611.

The restraint section surfaces 613 allow a distance between the inner peripheral surface of the housing 200 and the outer peripheral surface of the brake wedge 610 to be reduced. Accordingly, when the rollers 631 are located to come into contact with the restraint section surfaces 613, strong friction force is generated between the rollers 631 and the outer peripheral surface of the brake wedge 610 and between the rollers 631 and the inner peripheral surface of the housing 200, and thus rotation of the brake wedge 610 may be restricted. At the same time, rotation of the output shaft 620 may also be restricted.

However, when the rollers 631 are moved to the roller location surfaces 612, a gap is formed between the rollers 631 and the outer peripheral surface of the brake wedge 610 and between the rollers 631 and the inner peripheral surface of the housing 200, and thus the brake wedge 610 may freely rotate.

When each clutch leg 404 rotates along with rotation of the clutch drum 400, the clutch leg 404 may push the roller 631 coming into contact therewith in the rotation direction and move the roller 631 to the associated roller location surface 612. In addition, the other rollers 631 which are beyond the wedge bosses 611 may be moved to the associated roller location surfaces 612 by the friction force. In other words, the pair of rollers 631 may be close to each other by overcoming the elastic force of the roller spring 632 so as to be moved to the associated roller location surfaces 612, and thus the rotation restriction of the brake wedge 610 may be released. When the clutch legs 404 continue to push the rollers 631 by continuous rotation of the clutch drum 400, the brake wedge 610 rotates along with the clutch drum 400 and at the same time the output shaft 620 rotates together.

When reverse input torque acts when the height adjustment of the seat cushion 10 is completed and the rotation of the clutch drum 400 is stopped, the rollers 631 come into contact with the restraint section surfaces 613 as long as the rollers 631 are not pushed by the clutch legs 404, thereby generating strong friction force. Consequently, the brake wedge 610 may be maintained in a state in which the rotation thereof is restricted.

Meanwhile, the opened rear of the housing 200 may be closed by the cover plate 700. The cover plate 700 may have various shapes. For example, the cover plate 700 may have a disc shape and may have a shaft coupling portion 701 formed at a center thereof such that the second shaft 622 is rotatably coupled through the shaft coupling portion 701, as illustrated in the drawings.

Meanwhile, when the clutch block 300 rotates, for example, in the clockwise direction, reaction force may act on the clutch block 300 due to friction force between the clutch block 300 and the plurality of fitting pieces 500. In this case, the clutch block 300 tends to move toward a space S between both end portions of the plurality of fitting pieces 500 (hereinafter, referred to as "non-contact space") by a force acting toward the non-contact space S from among force components of the reaction force.

Such a force acts on the clutch block 300, and thus stress concentration may be generated on the roller 501 located at the right end portion of the plurality of fitting pieces 500 on the basis of the drawing or on the rollers 501 adjacent to the right end portion including the above roller 501.

In the embodiment, the protrusion portion 304 is formed on the outer peripheral surface of the clutch block 300 so as not to generate the stress concentration. The protrusion portion 304 protrudes radially from the outer peripheral surface of the clutch block 300. In this case, the protrusion portion 304 may protrude toward the non-contact space S as illustrated in FIG. 5.

The outside surface of the protrusion portion 304 may come into contact with the inner peripheral surface of the drum portion 401 when the clutch block 300 may rotate relative to the clutch drum 400.

In addition, the clutch block 300 may be minutely moved within a range in which the stress concentration is not generated. A minute clearance may also be present between the outside surface of the protrusion portion 304 and the inner peripheral surface of the drum portion 401 such that friction force is not generated between the outside surface of the protrusion portion 304 and the inner peripheral surface of the drum portion 401 when the clutch block 300 is returned and rotated. In this case, it is preferable that the clearance does not exceed 0.5 mm since the movement of the clutch block 300 is allowed within the range in which the stress concentration is not generated.

When the above-mentioned reaction force acts on the clutch block 300, the clutch block 300 may be supported by the protrusion portion 304 so as to be directed toward the non-contact space S. Thus, since the clutch block 300 is not moved toward the non-contact space S or only minute movement of the clutch block 300 is allowed, the stress concentration is not generated on the rollers 501. As a result, components including the clutch drum 400 may be prevented from being deformed or damaged.

The outside surface of the protrusion portion 304 may be a curved surface such that the protrusion portion 304 is supported in a large area without concentration of force thereon and by dispersion of the force when the protrusion portion 304 is supported by the inner peripheral surface of the drum portion 401. In this case, the outside surface of the protrusion portion 304 may be a curved surface having the same radius of curvature as that of the inner peripheral surface of the drum portion 401.

Various embodiments have been described in the best mode for carrying out the invention. Although the present invention has been described with respect to the illustrative embodiments, it will be apparent to those skilled in the art that various variations and modifications may be made without departing from the spirit and scope of the invention as defined in the following claims.

Simple variations and modifications of the present invention belong to the scope of the present invention, and the specific protection scope thereof will be apparent by the appended claims.

INDUSTRIAL APPLICABILITY

In accordance with the present invention, a protrusion portion is formed such that a clutch block is supported by an inner peripheral surface of a clutch drum, and thus movement of the clutch block is limited by reaction force. Consequently, stress concentration is prevented from being generated on a plurality of fitting pieces. Therefore, the present invention may prevent components such as the clutch drum from being deformed or damaged to enhance durability of a pumping device.

The invention claimed is:

1. A pumping device for a vehicle seat, including a clutch portion for receiving a rotational force from an outside and transferring to an output shaft, wherein the clutch portion comprises:
    a clutch block rotated by the rotational force transferred from the outside;
    a clutch drum transferring the power to the output shaft while rotating by the rotational force transferred from the clutch block; and
    a plurality of fitting pieces interposed between an outer peripheral surface of the clutch block and an inner peripheral surface of the clutch drum and transferring the rotational force of the clutch block to the clutch drum,
    wherein the plurality of fitting pieces comprises a plurality of adjacent rollers having an arc shape as a whole, and the rollers located at both end portions of plurality of rollers are spaced apart from each other, and
    wherein the clutch block has a protrusion portion extending between the rollers located at the both end portions of the plurality of rollers while protruding radially from the outer peripheral surface of the clutch block.

2. The pumping device according to claim 1, wherein an outside surface of the protrusion portion comes into contact with a circumferential surface of the clutch drum.

3. The pumping device according to claim 1, wherein a clearance which does not exceed 0.5 mm is present between an outside surface of the protrusion portion and the inner peripheral surface of the clutch drum.

4. The pumping device according to claim 1, wherein an outside surface of the protrusion portion is a curved surface.

5. The pumping device according to claim 4, wherein the outside surface of the protrusion portion has a same radius of curvature as that of the inner peripheral surface of the clutch drum.

* * * * *